US006880226B2

(12) United States Patent
McGill et al.

(10) Patent No.: US 6,880,226 B2
(45) Date of Patent: Apr. 19, 2005

(54) METHOD FOR LIMITING MOVEMENT IN ELECTRICAL CONTACTORS

(75) Inventors: Patrick McGill, Marlborough, CT (US); Dennis Zuffelato, Kensington, CT (US); Thuong Phung, Bristol, CT (US); Javier Larranaga, Bristol, CT (US); Mani Natarajan, Bangalore (IN); Agali Ramadevi, Bangalore (IN); AnilKumar D. Pandit, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/681,963

(22) Filed: Jun. 29, 2001

(65) Prior Publication Data

US 2003/0000814 A1 Jan. 2, 2003

(51) Int. Cl.[7] .................................................. H01S 4/00

(52) U.S. Cl. .......................... 29/592.1; 29/622; 29/825; 29/874; 29/876; 29/877; 200/16 A; 200/16 B; 200/16 C; 200/243; 200/307

(58) Field of Search ................................ 29/592.1, 622, 29/825, 874, 876, 877; 200/16 A, 16 B, 16 C, 243, 307

(56) References Cited

U.S. PATENT DOCUMENTS

| | | | | | |
|---|---|---|---|---|---|
| 4,029,924 | A | * | 6/1977 | Frank et al. | 200/307 |
| 4,063,054 | A | * | 12/1977 | Hirata | 200/159 R |
| 4,220,939 | A | * | 9/1980 | Grable | 337/94 |
| 4,250,368 | A | * | 2/1981 | Johnston et al. | 200/307 |
| 4,262,179 | A | * | 4/1981 | Bauer | 200/153 SC |
| 4,351,105 | A | * | 9/1982 | Poling | 29/622 |
| 4,446,614 | A | * | 5/1984 | Haag | 29/622 |
| 4,471,178 | A | * | 9/1984 | Nishizako et al. | 200/16 A |
| 4,514,602 | A | * | 4/1985 | Owen | 200/16 C |
| RE32,793 | E | * | 11/1988 | Baker et al. | 335/170 |
| 5,432,310 | A | * | 7/1995 | Stoeger | 200/82 R |
| 5,629,105 | A | * | 5/1997 | Matthews | 429/97 |
| 6,198,058 | B1 | * | 3/2001 | Graninger et al. | 200/50.02 |
| 6,248,965 | B1 | | 6/2001 | Thomas | |

* cited by examiner

*Primary Examiner*—Paul Kim
(74) *Attorney, Agent, or Firm*—Armstrong Teasdale LLP

(57) ABSTRACT

A method for restricting travel of a moving contact in a lighting contactor is provided. The lighting contactor includes the moving contact and a contact carrier. The method includes the steps of providing a spacer, and a biasing member and positioning the biasing member though the spacer. The method also includes installing the biasing member and the spacer in the contact carrier.

7 Claims, 3 Drawing Sheets

METHOD FOR LIMITING MOVEMENT IN ELECTRICAL CONTACTORS

BACKGROUND OF INVENTION

This invention relates generally to contactors, and more particularly to contactor movement and arc reduction in lighting contactor block assemblies.

Contactor block assemblies refer to single or multiple pole power switching devices located in a branch circuit, used to switch (make or break) one or more pieces of equipment. Frequently, automated lighting control applications use contactor block assemblies that include fixed and moving contacts. Lighting contactor block assemblies can be differentiated by many characteristics, including, but not limited to, lighting load type, load current, contact holding method, lighting contactor type, and number of poles. Further features include enclosure type, pole configuration, fusing type, control circuit, indicating lights, and auxiliary contacts.

In the past, contactor block assemblies were generally placed near the controlled equipment. In some applications, however, contactor block assemblies are located in a central cabinet located in an electrical equipment room near a panelboard. A shortened conductor length between the panelboard and the contactor block assembly central cabinet increases a fault current at the contactor. Regardless of the contractor assembly location, during a short circuit a large and rapid influx of electromagnetic energy pushes a moving contact in the lighting contactor away from a fixed contact. As the moving contact separates from the fixed contact an arc forms, causing an energy release. As the arc length grows longer, more energy is released. In some short circuits, the energy release is sufficient to breakdown plastic components in the contactor block assembly causing out-gassing. The out-gassing can result in physical damage to the contactors, contactor block assemblies and the central cabinet.

SUMMARY OF INVENTION

In one aspect, a method for restricting travel of a moving contact in a lighting contactor is provided. The lighting contactor includes the moving contact and a contact carrier. The method includes the steps of providing a spacer and providing a biasing member. The method also includes positioning the biasing member though the spacer and installing the biasing member and the spacer in the contact carrier.

In another aspect, a lighting contactor including a contact carrier, a moving contact extending through the contact carrier, and a biasing member housed in the contact carrier is provided. The biasing member biases the moving contact. The lighting contactor further includes a spacer and the biasing member extends through the spacer. The spacer limits travel of the moving contact within the contact carrier.

In a further aspect, a lighting contactor including a contact carrier, a moving contact, a spring, and a stainless steel spacer is provided. The contact carrier includes an access slot and a centerline axis. The moving contact includes a front, a back, a first end, a second end, and a retaining boss on the back substantially midway between the first end and the second end. The moving contact extends substantially perpendicular to the centerline axis through the contact carrier. The spring is within the contact carrier, engages the moving contact retaining boss, and biases the moving contact. The spring extends through the stainless steel spacer. The spacer includes a proximate end substantially parallel to the back. The spacer limits travel of the moving contact within the contact carrier.

In yet another aspect, a contactor block assembly including a block case, a plurality of fixed contacts, a plurality of terminal connections, and a lighting contactor is provided. The lighting contactor includes a contact carrier, at least one moving contact extending through the contact carrier, at least one biasing member housed in the contact carrier, one of the biasing members biasing one of the moving contacts, and at least one spacer. One of the biasing members extends through each of the spacers. Each spacer is configured to limit travel of one of the moving contacts within the contact carrier.

DETAILED DESCRIPTION

Figure 1:
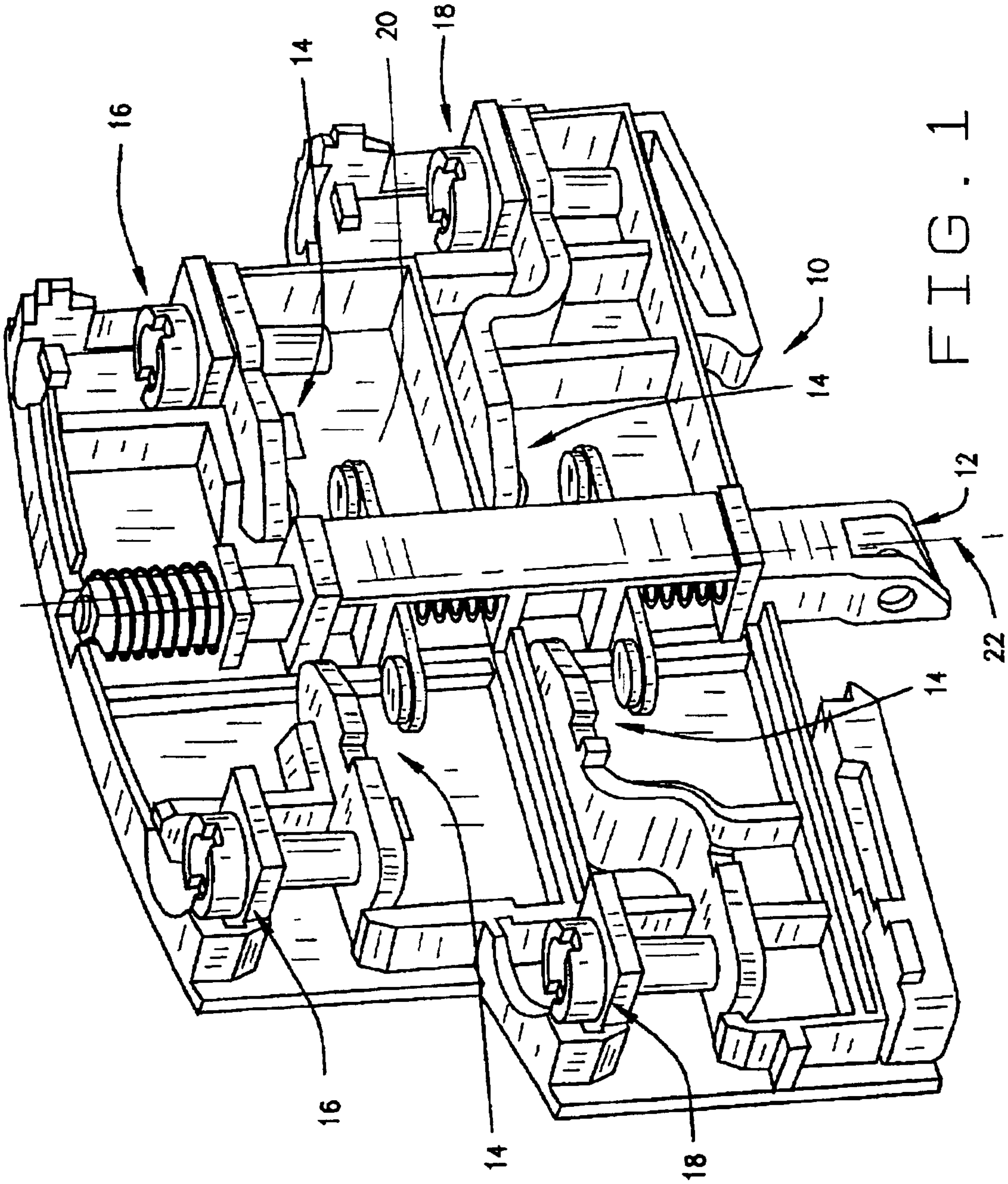
FIG. 1 is a perspective view of a contactor block assembly with an assembly cover removed.

FIG. 1 is a perspective view of a contact block assembly 10 with an assembly cover (not shown) removed. Contactor block assembly 10 includes a lighting contactor 12, a plurality of fixed contacts 14, a plurality of terminal connections 16, 18, and a block case 20. Lighting contactor 12 also includes a centerline axis 22 perpendicular to fixed contacts 14. Lighting contactor 12 moves within contact block assembly 10 to engage fixed contacts 14.

Figure 2:
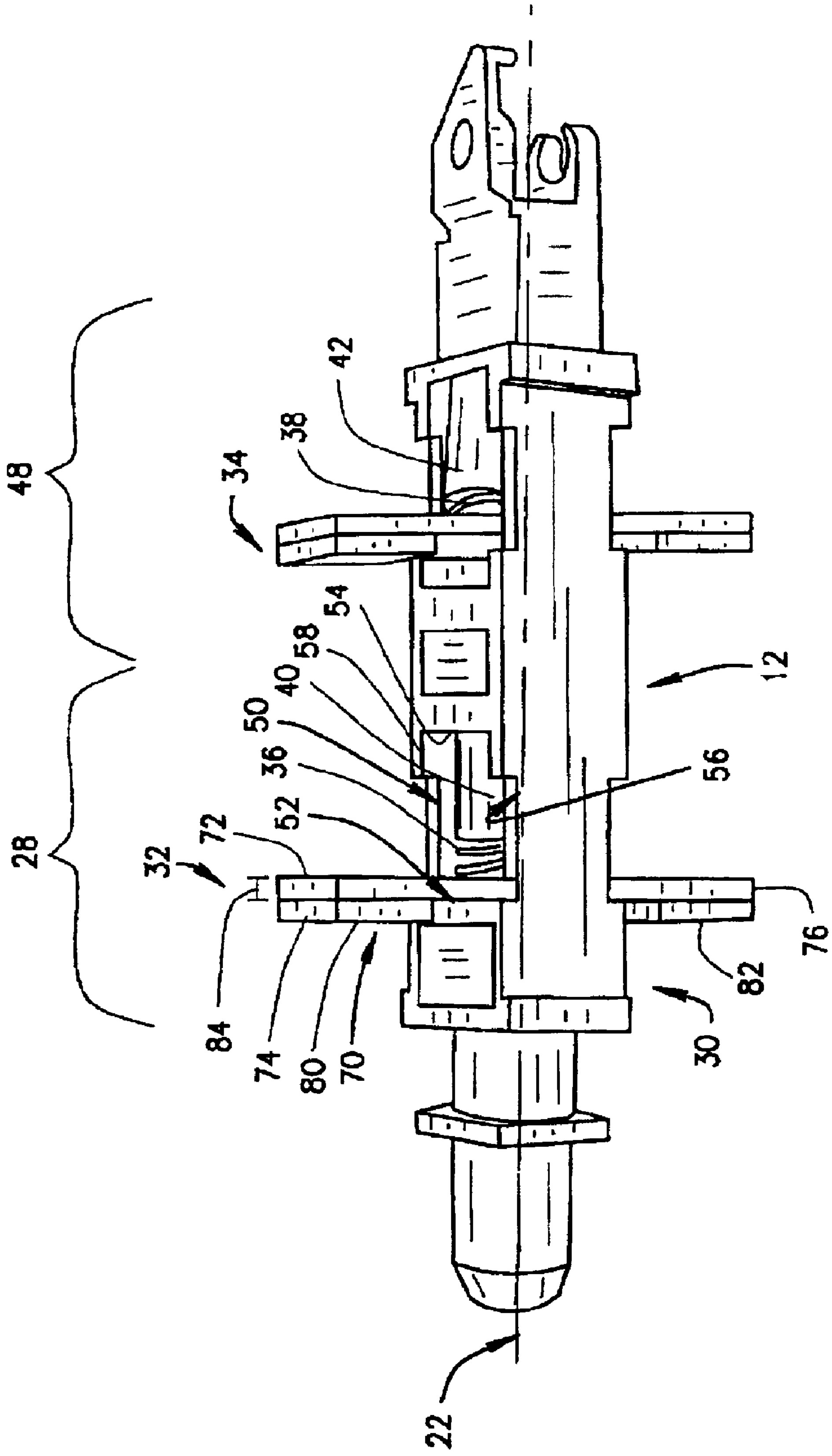
FIG. 2 is a perspective view of a lighting contactor of FIG. 1.
Figure 3:
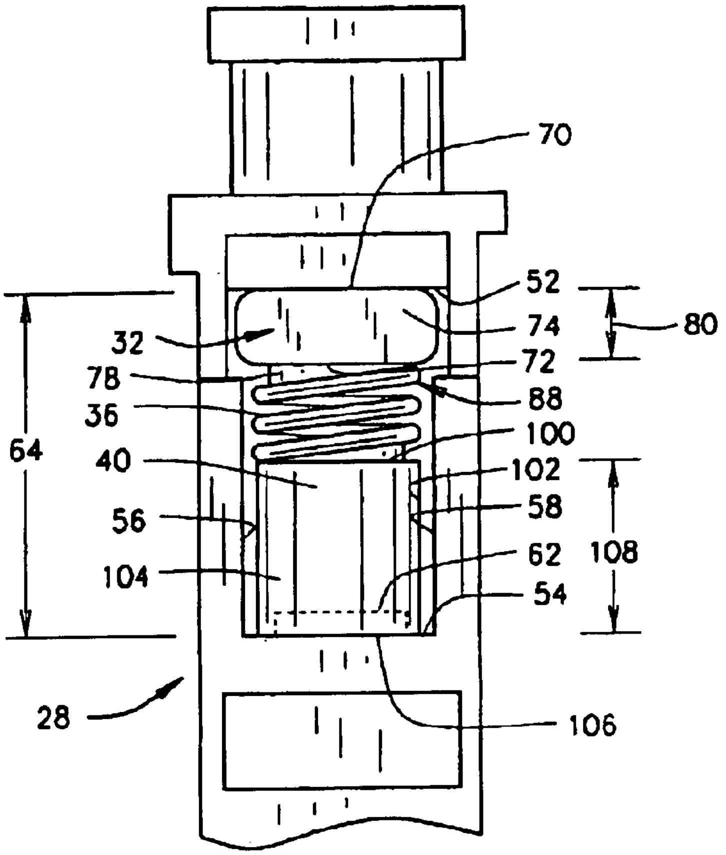
FIG. 3 is an enlarged top view of a portion of the lighting contactor of FIG. 2.

FIG. 2 is a perspective view of lighting contactor 12. FIG. 3 is an enlarged top view of a first portion 28 of lighting contactor 12. Lighting contactor 12 includes a contact carrier 30, a first moving contact 32, a second moving contact 34, a first biasing member 36, a second biasing member 38, a first spacer 40, and a second spacer 42.

In an exemplary embodiment, contact carrier 30 includes a first portion 28 and a second portion 48. First portion 28 includes first moving contact 32, first biasing member 36, and first spacer 40. Second portion 48 includes second moving contact 34, second biasing member 38, and second spacer 42. As first portion 28 and second portion 48 are substantially identical, only first portion 28 will be discussed. Further, in an alternate embodiment, contact carrier 30 includes only first portion 28. First portion 28 further includes an access slot 50 defined by a front wall 52, a rear wall 54, a first side wall 56 and a second side wall 58. In an exemplary embodiment, rear wall 54 includes a mounting tab 62. In an alternative embodiment, rear wall 54 includes a mounting socket (not shown). Access slot 50 includes a longitudinal length 64 aligned with the lighting contactor centerline axis 22.

First moving contact 32 includes a contact front 70, a contact back 72, a contact first end 74, a contact second end 76, and a retaining boss 78 on contact back 72. First moving contact 32 extends through first portion 28 in access slot 50 and is biased by first biasing member 36 to abut front wall 52. Contact front 70 includes a first engagement face 80 and a second engagement face 82, which facilitate electrical contact with fixed contacts 14 (shown in FIG. 1). First moving contact 32 is substantially perpendicular to and symmetrical about centerline axis 22. Retaining boss 78 is substantially midway between contact first end 74 and contact second end 76. First moving contact 32 also includes a thickness 84.

In an exemplary embodiment, biasing member 36 is a coil spring 36. First spring 36 includes a front end 88 and rear end 90. First spring 36 is positioned in access slot 50 and extends from rear wall 54 to contact back 72. More specifically, front end 88 is engaged with contact back 72 and rear end 90 is engaged with rear wall 54. As shown in FIG. 3, spring front end 88 receives and is mounted on retaining boss 78. Spring rear end 90 receives and is mounted on mounting tab 62. In an alternative embodiment, first spring 36 is a leaf spring (not shown).

Figure 4:
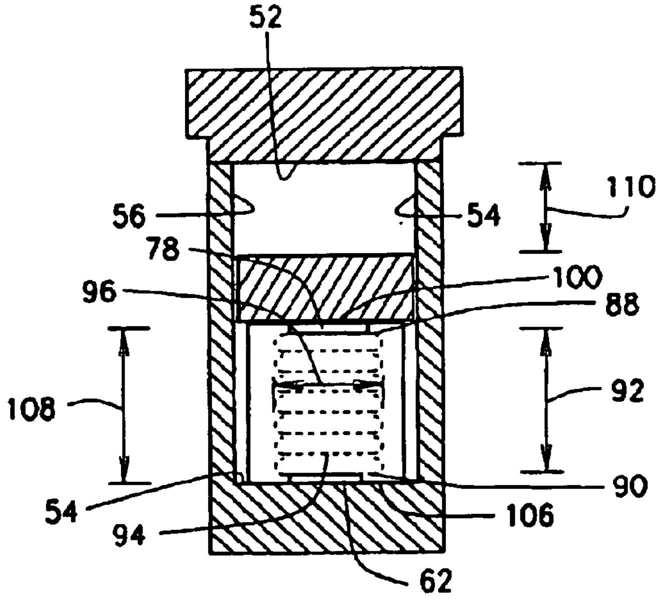
FIG. 4 is an enlarged top view of a portion of a lighting contactor in a compressed condition.

As shown in FIG. 4, first spring 36 further defines a compressed biasing member length 92, where spring 36 is compressed such that spring 36 presents a substantially closed cylindrical outer surface 94. First spring 36 also defines a cylindrical outer diameter 96.

As shown in FIGS. 3 and 4, first spacer 40 includes a proximate end 100, an inner surface 102, an outer surface 104 and a distal end 106. First spring 36 extends through first spacer 40 and first spacer 40 extends circumferentially around first spring 36. Inner surface 102 is sized larger than spring cylindrical outer diameter 96 to allow first spring 36 to move freely in first spacer 40. In an exemplary embodiment, first spacer 40 is a tube. Alternative embodiments of first spacer include, but are not limited to a tube with chamfered ends, a tube with a solid distal end, a tube with longitudinal openings, a hollow rectangle, and a hollow prism. Distal end 106 abuts rear wall 54. Proximate end 100 is planar and substantially parallel to contact back 72.

First spacer 40 further includes an axial length 108. In one embodiment, axial length 108 is slightly larger than or equal to compressed biasing length 92. In another embodiment, axial length 108 is determined based on a safe travel distance 110 for first moving contact 32. Safe travel distance 110 is determined based on allowable arc length, associated energy release, and contactor block assembly material. In an exemplary embodiment, first spacer 40 is fabricated from stainless steel. In alternative embodiment, other suitable material is used, including but not limited to, high temperature plastic.

To assemble lighting contactor 12, first spring 36 is compressed and a compressed biasing length 92 is determined. Alternatively, safe travel distance 110 is ascertained, by calculation or experimentation, and spacer axial length 108 is determined in conjunction with access slot longitudinal length 64 and first moving contact thickness 84. First spacer 40, with determined axial length 108, is then matched with first spring 36 having a smaller compressed biasing length 92.

Lighting contactor 12 is assembled by inserting first moving contact 32 in access slot 50, such that first moving contact 32 extends substantially symmetrically through access slot 50. First spring 36 is inserted through first spacer 40. Spring rear end 90 is installed on mounting tab 62. First spring 36 and first spacer 40 are placed in access slot 50 so that spring front end 88 receives and is frictionally engaged with retaining boss 78. First spring 36 biases first moving contact 32 to abut access slot front wall 52 when moving contact 32 is not in contact with fixed contact 14. Contactor block assembly 10 is disengaged. Proximate end 100 is aligned substantially parallel to moving contact back 72 and thus substantially perpendicular to centerline axis 22.

When contactor block assembly 10 is engaged, first moving contact 32 is in physical contact with fixed contact 14. More specifically, first engagement face 80 and second engagement face 82 engage fixed contact 14 (shown in FIG. 1). First spring 36 facilitates electrical contact between first moving contact 32 and fixed contact 14, while safe travel distance 110 facilitates small alignment differences between fixed contacts 14 and moving contact 32.

If a large current flow or short circuit occurs, the electromagnetic force pushes moving contact 32 out of physical contact with fixed contact 14, producing an electrical arc. As moving contact 32 is pushed axially rearward toward access slot rear wall 54, it engages first spacer 40. Specifically, planar proximate end 100 engages moving contact 32 and maintains moving contact 32 perpendicular to centerline axis 22. Thus, first engagement face 80 and second engagement face 82 are substantially equidistant from fixed contacts 14, minimizing the maximum arc length. If moving contact 32 were not perpendicular to centerline axis 22, the electrical arc would be longer, releasing greater energy, with increased possibility of damage to contactor block assembly 10.

Accordingly, lighting contactor 12 is a cost-efficient and effective switching device which reduces the travel of moving contacts in a contactor block assembly while maintaining the moving contact engagement faces equidistant from the fixed contacts. Lighting contactor 12 therefore reduces damaging arcs and provides for a long lasting and reliable contact block assembly.

While the invention has been described in terms of various specific embodiments, those skilled in the art will recognize that the invention can be practiced with modification within the spirit and scope of the claims.

What is claimed is:

1. A method for restricting travel of a moving contact in a lighting contactor, the lighting contactor including the moving contact and a contact carrier wherein the moving contact includes a retaining boss and wherein the contact carrier includes a mounting tab, said method comprising the steps of:

- providing a hollow spacer, said step of providing the spacer further comprises the step of:
  - determining a compressed biasing member length;
  - providing the spacer having a length substantially equal to said compressed biasing member length;
- providing a biasing member comprising a front end and a rear end;
- positioning the biasing member within the spacer such that the spacer extends only around the biasing member; and
- installing the biasing member and the spacer in the contact carrier such that the biasing member front end receives and is mounted on the moving contact retaining boss and the biasing member rear end receives and is mounted on the contact carrier mounting tab.

2. A method according to claim 1 wherein the contact carrier defines an access slot, said step of providing a spacer further comprises the step of:

- determining a moving contact safe travel distance; and
- providing the spacer sized to be received in the access slot, the spacer engaging the moving contact when the moving contact moves the safe travel distance.

3. A method for restricting travel of a moving contact in a lighting contactor, the lighting contactor including the moving contact and a contact carrier wherein the moving contact includes a retaining boss and wherein the contact carrier includes a mounting tab, said method comprising the steps of:

providing a hollow spacer;

providing a biasing member comprising a front end and a rear end;

positioning the biasing member within the spacer such that the spacer extends only around the biasing member; and installing the biasing member and the spacer in the contact carrier such that the biasing member front end receives and is mounted on the moving contact retaining boss and the biasing member rear end receives and is mounted on the contact carrier mounting tab, wherein said step of installing the biasing member further comprises the step of aligning a substantially planar proximate end of the spacer substantially parallel to a back of the moving contact.

4. A method according to claim 3 wherein said step of aligning the spacer further comprises the step of aligning the spacer to engage the moving contact back upon rearward axial movement of the moving contact relative to a front wall and a rear wall of the contact carrier and a centerline axis of the lighting contactor.

5. A method for limiting movement of a moving contact, said method comprising:

providing a lighting contactor including an access slot, the moving contact, and a contact wherein the access slot includes a longitudinal axis, the moving contact includes a retaining boss, and the contact carrier includes a mounting tab;

calculating a moving contact safe travel distance;

providing a spacer with at least one longitudinal opening and having a length substantially equal to the moving contact safe travel distance; and inserting a biasing member through the at least one longitudinal opening of the spacer, such that a biasing member front end receives and is frictionally engaged with the retaining boss and a biasing member rear end receives and is mounted on the mounting tab.

6. The method according to claim 5 further comprising positioning the spacer and the biasing member within the access slot of the lighting contactor.

7. The method according to claim 5 wherein providing the spacer with at least one longitudinal opening further comprises providing a tubular spacer with at least one longitudinal opening.

* * * * *

UNITED STATES PATENT AND TRADEMARK OFFICE
CERTIFICATE OF CORRECTION

PATENT NO. : 6,880,226 B2
APPLICATION NO. : 09/681963
DATED : April 19, 2005
INVENTOR(S) : McGill et al.

It is certified that error appears in the above-identified patent and that said Letters Patent is hereby corrected as shown below:

In Claim 5, column 6, line 2, delete “contact wherein” and insert therefore -- contact carrier, wherein --

Signed and Sealed this

Third Day of July, 2007

JON W. DUDAS
*Director of the United States Patent and Trademark Office*